(No Model.)

A. BACK.
BOX FOR RUCHING, LACES, &c.

No. 244,519.  Patented July 19, 1881.

WITNESSES:
F. McArdle
C. Sedgwick

INVENTOR:
A. Back
BY Munn &Co
ATTORNEYS.

UNITED STATES PATENT OFFICE.

ALBERT BACK, OF NEW YORK, N. Y.

BOX FOR RUCHING, LACES, &c.

SPECIFICATION forming part of Letters Patent No. 244,519, dated July 19, 1881.

Application filed May 16, 1881. (No model.)

*To all whom it may concern:*

Be it known that I, ALBERT BACK, of the city, county, and State of New York, have invented a new and Improved Box for Ruching, Laces, and Embroidery, of which the following is a specification.

The object of my invention is to provide a new and improved box for packing and exhibiting ruchings, laces, embroideries, and analogous articles.

The invention consists in a box provided with a reel pivoted to arms of one of the longitudinal sides of the box, which side is hinged to the bottom of the box so that it will swing outward into a horizontal position, the arms carrying the reel being in a vertical position, and thus permitting the reel to turn freely.

Figure 1:
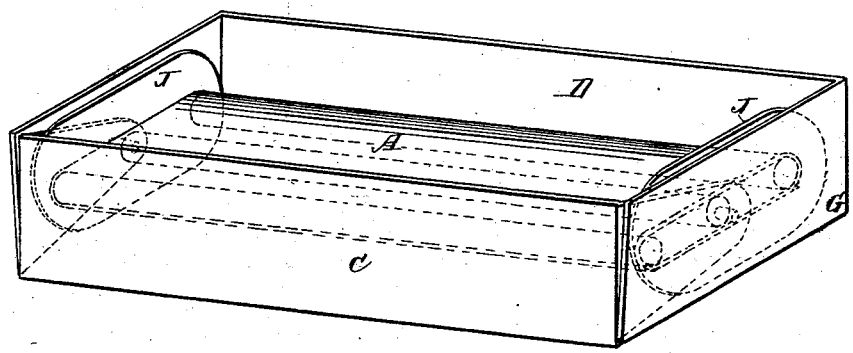
Figure 2:
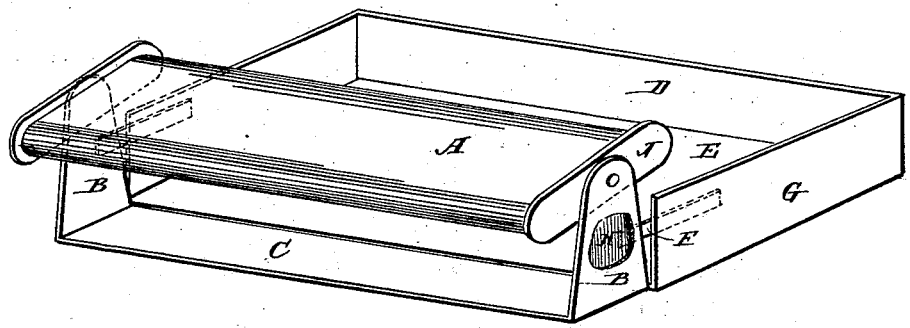
Figure 3:
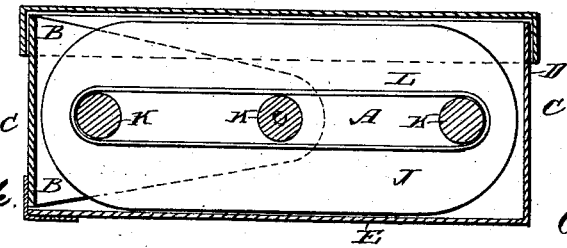

In the accompanying drawings, Figure 1 is a perspective view of my improved box for embroideries, ruchings, laces, &c., showing the reel contained in the box. Fig. 2 is a perspective view of the same, showing the hinged side of the box swung outward; and Fig. 3 is a cross-sectional elevation of the box.

Similar letters of reference indicate corresponding parts.

A reel, A, is pivoted to the arms B of the side C of box D, which side C is pivoted to the bottom E of the box in such a manner that it can be swung outward into a horizontal position, as shown in Fig. 2.

The arms B project to the inside of the box, and are of such height that the reel A can turn freely when the arms B are vertical—that is, when the side C is swung outward into a horizontal position. The arms B are preferably arranged at the ends of side C, so that the reel A can be as long as the box.

Check-bands F, attached to the arms B and the ends G of the box, prevent the arms B from being inclined outward. The reel A is preferably made of two end pieces, J, united by two or more rods or strips, K, covered with paper or muslin L; but the reel may be of any desired construction.

The arms B are stiffened by a sheet, H, of metal, attached to or contained within the arms.

The box is used as follows: The side C is swung outward so that the reel A can rotate on its pivots, and the lace, embroidery, ruching, or analogous article is wound on the same, upon which the side C is folded down, so that the reel A will be contained in the box D, as shown in Figs. 1 and 3. If the goods are to be exhibited or unwound, the side C is swung outward, so that it and the reel will be in the position shown in Fig. 2.

Having thus described my invention, I claim as new and desire to secure by Letters Patent—

1. A box for ruchings, lace, embroidery, &c., constructed substantially as herein shown and described, with a reel pivoted to arms of one of the sides, which is hinged to the bottom of the box, as set forth.

2. The combination, with the box D, having the side C hinged to the bottom E, and provided with the arms B, of the reel A, pivoted to the arms B and the check-bands F; substantially as herein shown and described, and for the purpose set forth.

ALBERT BACK.

Witnesses:
 OSCAR F. GUNZ,
 C. SEDGWICK.